United States Patent
Yoshikawa

(10) Patent No.: US 7,182,471 B2
(45) Date of Patent: Feb. 27, 2007

(54) PROJECTION TYPE DISPLAY APPARATUS

(75) Inventor: Tsutomu Yoshikawa, Daito (JP)

(73) Assignee: Funai Electric Co., Ltd., Daito (JP)

( * ) Notice: Subject to any disclaimer, the term of this patent is extended or adjusted under 35 U.S.C. 154(b) by 18 days.

(21) Appl. No.: 10/855,314

(22) Filed: May 28, 2004

(65) Prior Publication Data

US 2004/0239883 A1 Dec. 2, 2004

(30) Foreign Application Priority Data

May 30, 2003 (JP) ............................. 2003-155496

(51) Int. Cl.
*G03B 21/14* (2006.01)
(52) U.S. Cl. ........................ 353/98; 385/901; 353/122
(58) Field of Classification Search .................. 353/98, 353/99, 119, 122; 385/133, 146, 901; 349/5, 349/6, 7, 8, 9
See application file for complete search history.

(56) References Cited

U.S. PATENT DOCUMENTS

| | | | | |
|---|---|---|---|---|
| 5,462,700 | A * | 10/1995 | Beeson et al. | 264/1.27 |
| 5,933,183 | A * | 8/1999 | Enomoto et al. | 347/241 |
| 6,394,611 | B1 * | 5/2002 | Wang et al. | 353/119 |
| 6,412,954 | B1 * | 7/2002 | Wang | 353/98 |
| 6,646,806 | B1 * | 11/2003 | Bierhuizen | 359/618 |
| 6,739,723 | B1 * | 5/2004 | Haven et al. | 353/20 |
| 6,926,413 | B2 * | 8/2005 | Akiyama | 353/122 |
| 2002/0185699 | A1 | 12/2002 | Reid | |

2004/0041984 A1 3/2004 Tani et al.

FOREIGN PATENT DOCUMENTS

| | | |
|---|---|---|
| JP | 3079752 | 6/2001 |
| JP | 2001-228541 | 8/2001 |
| JP | 2002-323670 | 11/2002 |
| JP | 2004-93623 A | 3/2004 |
| WO | WO 98/37448 | 8/1998 |

OTHER PUBLICATIONS

Partial English translation of Japanese Office Action dated Sep. 6, 2006 (Two (2) pages).

* cited by examiner

*Primary Examiner*—William C. Dowling
(74) *Attorney, Agent, or Firm*—Crowell & Moring LLP

(57) ABSTRACT

A projection type display apparatus comprises a rod type integrator 6 having a solid rod structure, in which light being emitted from a lamp and entering an entrance face 6*a*, as a focal plane, at one end of the solid rod is guided by being internally reflected therein, and is emitted from an exit face 6*c* as a further focal plane at the other end of the solid rod. A parallel glass plate is attached to the exit face 6*c*. The glass plate 11 has a flange-shaped extension portion 11*a*, which extends from periphery of the solid rod, and which serves as a holding portion for holding the integrator. This realizes little or no loss of light to be caused by light leakage outside the solid rod, thereby preventing the integrator from decreasing light use efficiency. Furthermore, the exit face 6*c*, as the further focal plane, of the solid rod is prevented from having e.g. dust deposited thereon, thereby causing no influence on deterioration of projected images. Parallel glass plates 11 made of a material having a coefficient of line thermal expansion similar to that of the solid rod can be attached to the entrance face 6*a* as the focal plane and the exit face 6*c* as the further focal plane, respectively, of the solid rod.

6 Claims, 7 Drawing Sheets

PROJECTION TYPE DISPLAY APPARATUS

BACKGROUND OF THE INVENTION

1. Field of the Invention

The present invention relates to a projection type display apparatus using a rod type integrator having a rod to internally reflect light entering an entrance face and emit the light from an exit face thereof.

2. Description of the Related Art

A projection type display apparatus is known such as a projector to project, onto a screen, images formed by an electro-optical device such as a liquid crystal panel or a DMD (digital micro-mirror device) on the basis of image data from a personal computer, a video camera or the like. In this kind of projection type display apparatus, a rod type integrator system is known as a means to provide uniform illuminance distribution of an emitted light beam. In such system, light entering one end face, as an entrance face, of a rod such as a glass rod is internally reflected within the rod, and is emitted from an exit face thereof. The effect of the rod type integrator increases or decreases depending on number of internal reflections within the rod, F value of a light source, and so on. It is known as being effective to reduce the cross section of the rod and to increase the length of the rod as well as to set the F value of the light source to a low value.

It is easy for this rod type integrator system to heighten parallelism of illumination light and to be adapted to miniaturization of electro-optical devices such as liquid crystal panels. Examples of rods to be used for the rod type integrator are a solid rod such as being made of glass, and a hollow rod such as having an internal surface made of mirror surface. It is known that the solid rod e.g. of glass can use light more efficiently than the hollow rod, since the surface of the internal reflection in the case of the solid rod can have a reflectivity of nearly 100%.

In the case of the solid rod, however, if a portion of side surface thereof is contaminated with dirt or damaged, the total reflection condition in the rod is corrupted, thereby causing light leakage at such portion. This causes a problem that the light use efficiency decreases. Furthermore, optical components such as a condenser lens are interposed between the exit face of the rod and the electro-optical device such as a liquid crystal panel, so that the exit face of the rod and the electro-optical device are conjugate with respect to the optical components. Accordingly, if e.g. dust is deposited on the exit face of the rod, an image containing an image of the dust being deposited is formed at the position of the electro-optical device, and is thus formed on the screen as well.

For solving such problem, it is known to cover the side surface of the solid rod with a cover member made of a tubular body, and further to provide transparent member(s) on the entrance face and/or the exit face of the solid rod. (Refer to Japanese Laid-open Patent Publication 2001-228541.) In the case of this known technology, e.g. incoming dust to deposit on the side surface of the rod can be reduced, since the side surface of the solid rod is covered with the cover member.

It is described in the above-referred Patent Publication that because of the provision of the transparent member on the exit face of the rod, no images of e.g. dust are formed on a liquid crystal panel, which is conjugate with the exit face of the rod, and hence that images of e.g. dust are prevented from being formed on the screen. It is further described therein that because e.g. dust can be prevented from incoming and depositing on the side surface of the rod, it becomes possible to increase the light use efficiency.

However, according to the apparatus described in the above-referred Patent Publication, the solid rod is fixed to the cover member using a screw, although it is described therein to so hold the solid rod as to reduce its contact with the cover member as much as possible. Accordingly, light leakage still occurs at a portion of the solid rod where the screw makes a point contact thereby causing light use efficiency to decrease. In the case of the configuration as shown in FIG. 6 of the above-referred Patent Publication, in particular, the exit end face of the solid rod is positioned at a space in the cover member. Accordingly, e.g. dust generated at the time of tightening the screw may deposit on the exit end face of the solid rod, thereby causing images of e.g. the dust to be formed at the position of the electro-optical device, and thus deteriorating projected images.

In the case of the configuration as shown in FIG. 8 of the above-referred Patent Publication, a condenser lens is attached to the exit end face of the solid rod. However, since such end face is a face to function as a focal plane, it is disadvantageous that the condenser lens is attached to such end surface. Further, in the case of the configuration as shown in FIG. 12 of the above-referred Patent Publication, a condenser lens is attached to an exit end face of a hollow rod (light tunnel). In such case, the focal plane at the exit thereof is positioned at a position inner than the end face of the hollow rod, whereby an end portion of the hollow rod from the end face thereof to the focal plane at the exit thereof becomes a useless portion.

Moreover, in the above-referred Patent Publication, a holding unit having a rectangular shape is used. Accordingly, it is not easy to adjust the relative positions of the solid rod or the hollow rod with the optical components placed in front of and behind such rod in the direction of the axis of such rod. In particular, it is not easy therein to adjust centering of such elements. Furthermore, since the rod is covered with the cover member, there is a problem particularly in the case of the solid rod which is likely to be easily heated by a light beam to an overheat condition, such that it is difficult to sufficiently cool the solid rod in its entirety.

SUMMARY OF THE INVENTION

An object of the present invention is to provide a projection type display apparatus using a rod type integrator, such that the integrator hardly decreases light use efficiency, and that images of e.g. dust can be suppressed from being formed on a position of an electro-optical device, thereby reducing the rate of deterioration of projected images.

A further object of the present invention is to provide a projection type display apparatus using a rod type integrator, such that it is easy to adjust relative positions of the rod with optical components placed in front of and behind such rod in the direction of the axis of such rod, and that the rod can be easily cooled.

The above object of the present invention is achieved according to the present invention by providing a projection type display apparatus comprising: a lamp to emit light; a rod type integrator comprising a solid rod to have the light from the lamp enter an entrance face at an end thereof and to guide the light by having the light internally reflected therein as well as to emit the light from an exit face at another end thereof; an electro-optical device having an illuminated surface, on which the light emitted from the integrator is illuminated, and being provided to modulate the light for forming an image; and optical components, including a lens unit, to project, onto a screen, the image formed by the electro-optical device, wherein a glass plate is attached to the exit face of the solid rod, wherein the exit face of the solid rod serves as a focal plane of the lens unit which is placed facing the exit face of the solid rod, with the glass plate intervening between the lens unit and the exit face of the solid rod; and wherein the glass plate has a flange-shaped extension portion extending from periphery of the solid rod, the flange-shaped extension portion serving as a holding portion for holding the integrator.

According to the present invention, it becomes possible for only an air layer to contact the peripheral surface of the solid rod which guides the entering light by having the light internally reflected therein, thereby preventing the peripheral surface of the solid rod from contacting a holding member or holding portion for holding the solid rod. Thus, this realizes little or no loss of light to be caused by light leakage outside the solid rod, thereby preventing the integrator from decreasing light use efficiency. Furthermore, since a glass plate is attached to the exit face at the end of the solid rod which serves as a focal plane, the exit face is prevented from having, deposited thereon, e.g. dust which, if deposited on the exit face, may deteriorate projected images by being formed as an image at the position of the electro-optical device. It is to be noted that e.g. dust, even if deposed on an outer surface of the glass plate, hardly influences deterioration of projected images. This is because the position of the deposited dust, which is the outer surface of the glass plate, is off the focal plane, so that the image at the electro-optical device containing an image of the dust becomes out of focus.

Preferably, a light transmitting resin is used to attach the glass plate to the exit face of the solid rod. Thereby, the interface between the solid rod and the glass plate is prevented from causing light loss.

Preferably, the parallel glass plate to be attached to the solid rod has a coefficient of linear thermal expansion similar to that of the solid rod. Thereby, the interface between the solid rod and the glass plate is prevented from causing stress due to temperature rise.

According to the present invention, furthermore, it is possible that an optical axis of the glass plate attached to the solid rod is aligned with an optical axis of the solid rod, and that the glass plate has a flange-shaped extension portion extending from periphery of the solid rod and having a circular or a partially arc shape. This facilitates relative positioning, particularly central axis alignment and integrator angle adjustment, between the integrator and optical components, each having an optical axis, in front of and behind the integrator at the time of allowing the flange-shaped extension portion to be held by a holding structure for holding the rod type integrator. Further, by providing glass plates each having the flange-shaped extension portion at both ends of the solid rod, it becomes possible to facilitate ventilation for the integrator even under an environment where the integrator is heated to a high temperature, and also possible to easily cool the integrator in its entirety.

According to the present invention, it is also possible that the integrator comprises, in place of the solid rod, a hollow rod having a structure of light tunnel which has an internal surface made of mirror surface, wherein a further glass plate is intimately attached to the entrance face of the hollow rod in addition to the glass plate attached to the exit face of the hollow rod, whereby the light tunnel has a closed structure therein. This light tunnel configuration makes it possible to obtain effects similar to those of the above-described solid rod configuration, except that this light tunnel configuration is slightly inferior to the above-described solid rod configuration in light reflection efficiency, because the entering light is guided in this light tunnel configuration by being internally reflected on the internal mirror surface of the hollow rod of the light tunnel structure. In addition, light tunnel configuration is advantageous in that the light tunnel structure can be dust-proof at inside thereof, and that the entire length of the light tunnel structure can be effectively used.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 2A is a schematic side view of a rod type integrator to be used for the optical system of the projection type display apparatus according to Embodiment 1, while

FIG. 6A is a schematic side view of a rod type integrator to be used for the optical system of the projection type display apparatus according to Embodiment 2, while

FIG. 9A is a schematic cross-sectional side view of a rod type integrator, having a structure of light tunnel, to be used for an optical system in a projection type display apparatus according to Embodiment 3, while

DESCRIPTION OF THE PREFERRED EMBODIMENTS

Projection type display apparatus according to embodiments of the present invention will be described in the following non-limiting Examples with reference to the drawings.

Embodiment 1

Figure 1:
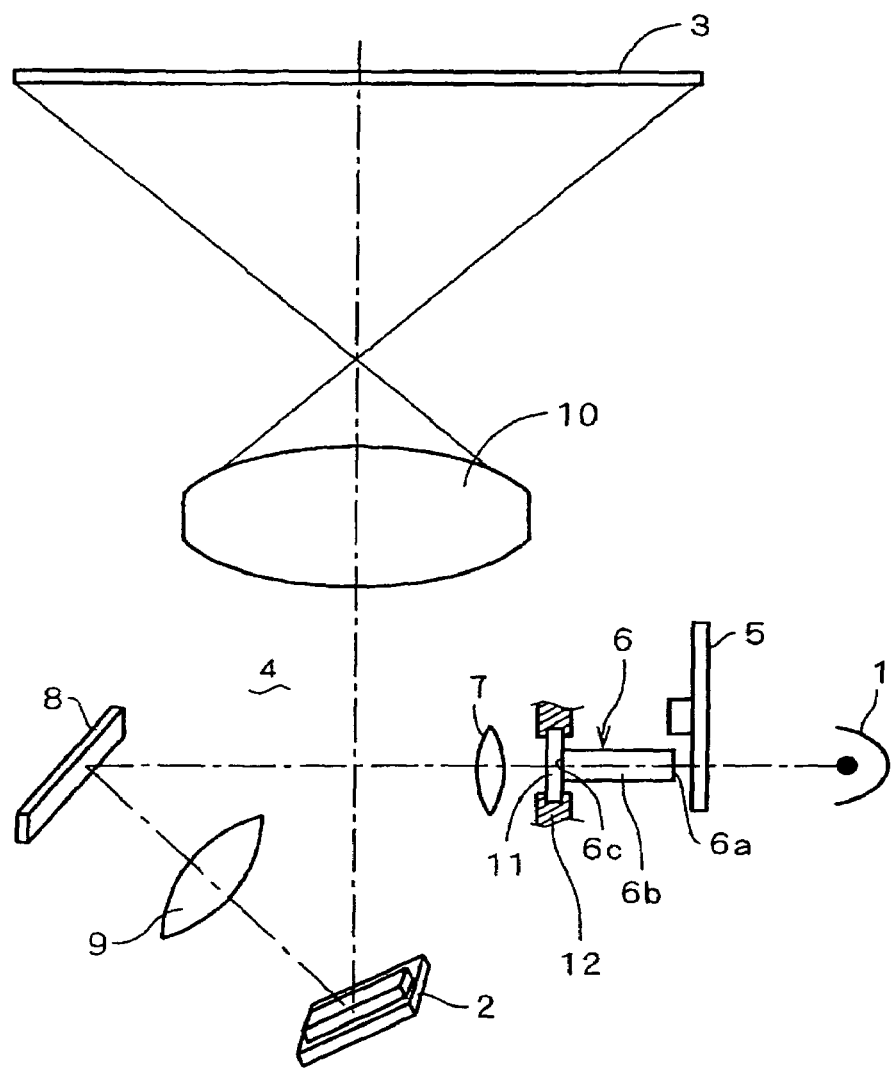
FIG. 1 is a schematic drawing of a configuration of a projection type display apparatus, mainly an optical system therein, according to Embodiment 1 of the present invention.
Figure 2A:
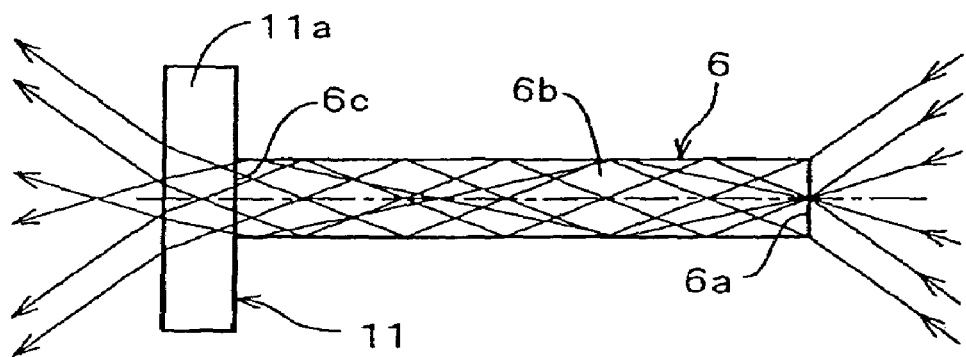
Figure 2B:
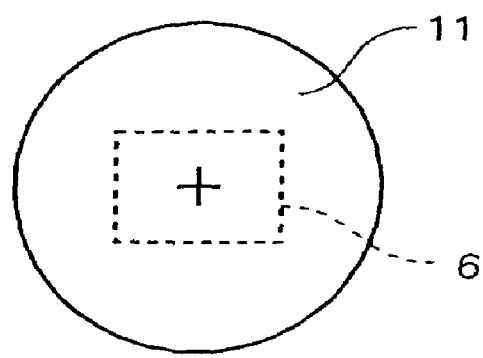
FIG. 2B is a schematic front view thereof.
Figure 3:
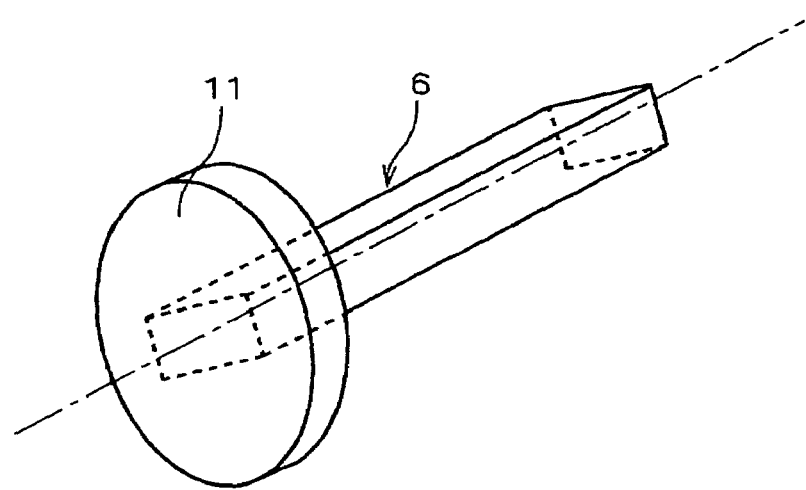
FIG. 3 is a schematic perspective view of the rod type integrator.

FIG. 1 shows a projection type display apparatus (generally referred to as image projector), mainly an optical system therein, according to Embodiment 1 of the present invention, while FIG. 2 and FIG. 3 show a rod type integrator to be used for the optical system of the projection type display apparatus. This projection type display apparatus comprises, as a projection engine: a lamp 1 as a light source to emit light; an electro-optical device 2, such as DMD (digital micro-mirror device), to form an image; and an image projection optical system 4 to demodulate, on the basis of the image formed thereby, the light from the lamp 1 for projecting and displaying an image on a screen 3. The image projection optical system 4 comprises optical components comprising: rotating color wheels 5 placed in correspondence with RGB (red, green and blue) colors in order from the lamp 1 along the optical axis; a rod type integrator 6 comprising a solid rod to condense and uniform the light from the lamp 1; a lens 7; a mirror 8; a condenser relay lens 9; and a projection lens 10. These elements comprising the lenses constitute a lens unit.

The integrator 6 comprises a solid rod made of a glass material having a rectangular cross section, and comprises: an entrance face 6a as a focal plane (i.e. entrance focal face) at an end thereof which the light from the lamp 1 enters; a rod body portion 6b to guide the light by having the light repeatedly internally reflected therein; and an exit face 6c as a focal plane (i.e. exit focal face) at the other end thereof, outside of which the guided light is emitted. This integrator 6 is used to obtain condensed and uniformed light with a relatively short light path length, whereby the reduction of the light path length can reduce the size of the image projection optical system. The exit face 6c is designed to be a focal plane of the lens 7.

Furthermore, a parallel glass plate 11 having a uniform thickness and being made of a material having a refractive index similar to that of the solid rod is attached to the exit face 6c of the integrator 6, using a light transmitting resin. One of examples of the light transmitting resins therefor is a UV curing adhesive. This parallel glass plate 11 has a flange-shaped extension portion 11a extending from periphery of the solid rod and having a circular shape. The flange-shaped extension portion 11a serves as a holding portion for holding the integrator. More specifically, the integrator 6 is held in a manner that the flange-shaped extension portion 11a is held by a frame 12 of the projection engine. Thus, the peripheral surface of the rod body portion 6b of the integrator 6 is in contact with an air layer only. The optical axis of the rod body portion 6b of the integrator 6 is aligned with the central axis of the glass plate 11 having the circular flange-shaped extension portion 11a.

An image-forming surface of the electro-optical device 2 is an illuminated surface on which the light emitted from the integrator 6 is illuminated through the lens 7, the mirror 8 and the relay lens 9. The image-forming surface has a rectangular shape. In correspondence with such shape, the integrator 6 is designed to have a cross section of a rectangular shape as well. The illuminated light is reflected by the illuminated surface, and modulated by the reflection. The thus modulated light is projected onto the screen 3 through the projection lens 10, whereby images are displayed thereon. The reflection mirror 8 reflects the light from the lamp 1 to bend the light path to the electro-optical device 2, thereby contributing to reduction of the size of the image projection optical system.

Figure 4:
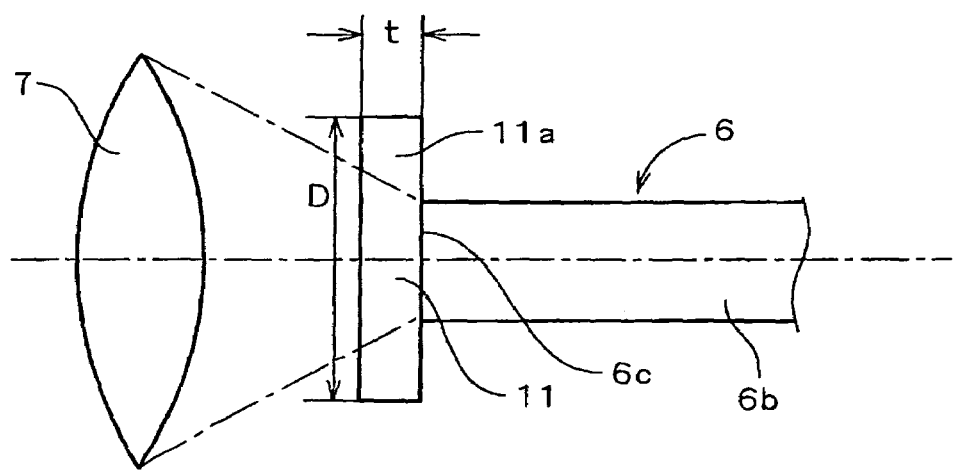
FIG. 4 is a schematic drawing of a configuration of a part of the optical system, showing a parallel glass plate attached to an exit face, as a focal plane, of the rod type integrator.

FIG. 4 shows a configuration of a part of the optical system including a parallel glass plate 11 attached to an exit face 6c, as a focal plane, of the integrator 6. The circular flange-shaped extension portion 11a of the parallel glass plate 11 has a diameter D as determined by a maximum emission angle θ (which is determined by a critical angle of the integrator 6) at the exit face 6c and by the F-number of the lens 7. The diameter D is designed to have a size such that the light beam from the exit face 6c is not influenced by outer peripheral surface of the flange-shaped extension portion 11a. The thickness t of the parallel glass plate 11 is determined by a magnification ratio, namely by a ratio of the diagonal length of the rectangular image area of the electro-optical device 2 to the diagonal length of the rectangular cross section of the rod body portion 6b. The thickness t of the glass plate 11 is designed to be such that e.g. dust, even if deposited on an outer surface of the glass plate 11 (i.e. on a surface of the glass plate 11 opposite to the surface thereof having the integrator 6 attached thereto), is sufficiently off the focal plane, and hence that an image at the electro-optical device 2 containing an image of such dust becomes out of focus, so that such dust hardly influences deterioration of projected images.

In the projection type display according to the present Embodiment 1 as described above, only an air layer is in contact with the peripheral surface of the solid rod of the rod type integrator 6 which guides the entering light by having the light internally reflected therein, thereby preventing the peripheral surface of the solid rod from contacting a holding member or holding portion for holding the solid rod. Thus, as compared with a conventional configuration in which the rod is held by point contact using a screw, the configuration according to Embodiment 1 realizes much less or no loss of light to be caused by light leakage outside the solid rod, thereby preventing the integrator 6 from decreasing light use efficiency. Furthermore, if e.g. dust is deposited on the exit face 6c of the solid rod according to a conventional technology, an image of the dust is formed at the position of the electro-optical device 2, thereby deteriorating projected images. In contrast thereto, according to the configuration of Embodiment 1, a parallel glass plate 11 is attached to the exit face 6c of the solid rod which serves as a focal plane. Accordingly, such dust, even if deposed on an outer surface of the glass plate, hardly influences deterioration of projected images. This is because the position of such deposited dust is off the focal plane, so that the image at the electro-optical device 2 containing an image of such deposited dust becomes out of focus. Besides, it is easy to handle the integrator 6, because the flange-shaped extension portion 11a, even if contaminated with dirt, does not deteriorate images.

According to the present Embodiment 1, it is also possible that the integrator comprises, in place of the solid rod, a hollow rod 16 as shown in later illustrated FIG. 9 having a structure of light tunnel which has an internal surface made of mirror surface, wherein a further glass plate is intimately attached to the entrance face of the hollow rod in addition to the glass plate attached to the exit face of the hollow rod, whereby the light tunnel has a closed structure therein. This light tunnel configuration makes it possible to obtain effects similar to those of the above-described solid rod configuration, except that this light tunnel configuration is slightly inferior to the above-described solid rod configuration in light reflection efficiency, because the entering light is guided in this light tunnel configuration by being internally reflected on the internal mirror surface of the hollow rod of the light tunnel structure. In addition, the hollow rod 16 having the light tunnel structure is advantageous in that the light tunnel structure can be dust-proof at inside thereof, and that the entire length of the hollow rod 16 having the light tunnel structure can be effectively used.

It is to be noted that the present invention is not limited to the configuration according to the above-described Embodiment 1, and various modifications are possible. For example, it is possible to additionally attach a further parallel glass plate to the entrance face of the solid rod at the other end thereof in the rod type integrator of Embodiment 1.

Embodiment 2

Figure 5:
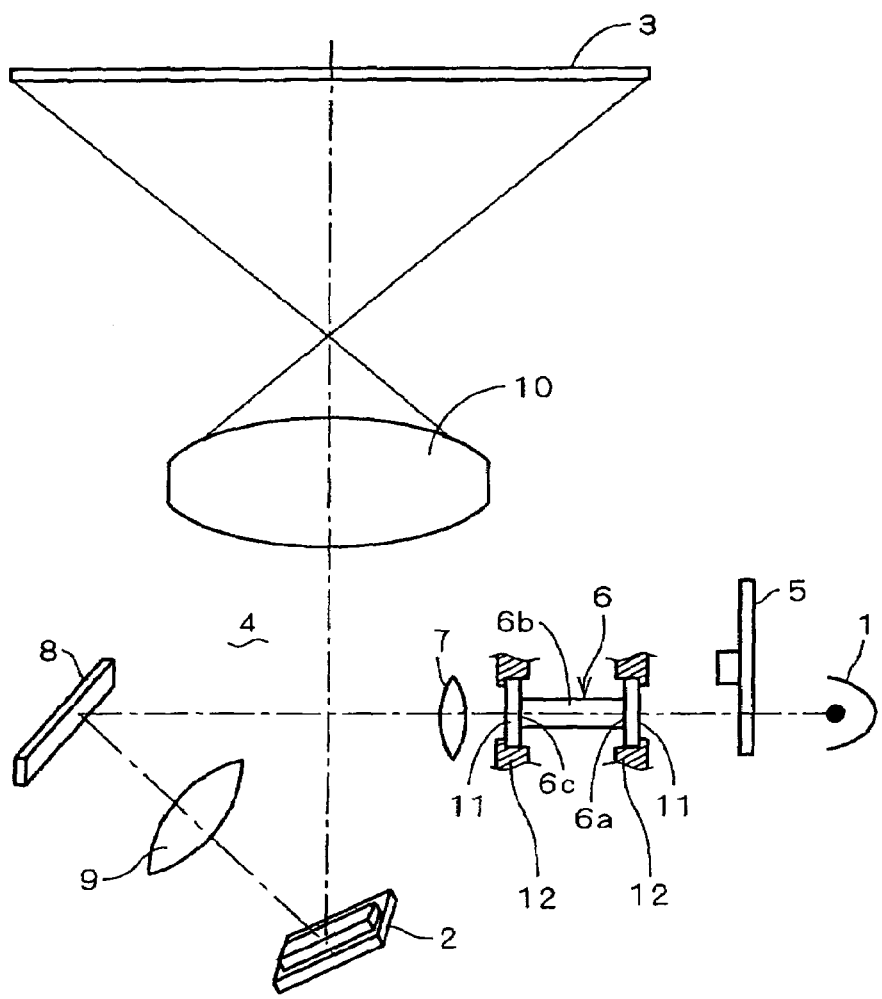
FIG. 5 is a schematic drawing of a configuration of a projection type display apparatus, mainly an optical system therein, according to Embodiment 2 of the present invention.
Figure 6A:
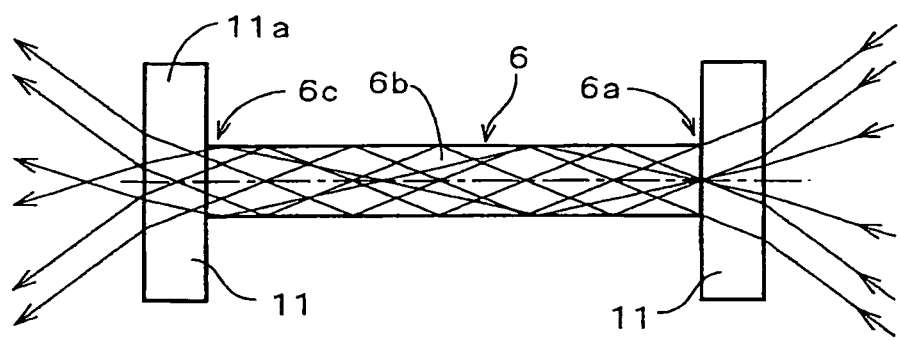
Figure 6B:
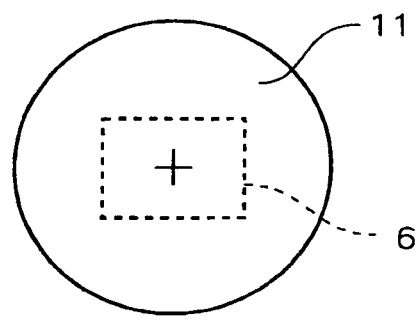
FIG. 6B is a schematic front view thereof.
Figure 7:
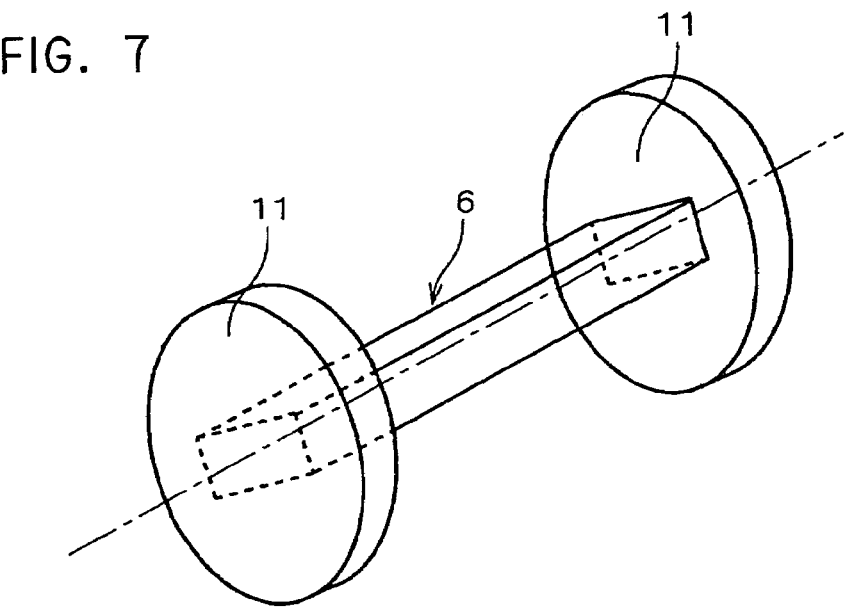
FIG. 7 is a schematic perspective view of the rod type integrator.

FIG. 5 shows a configuration of a projection type display apparatus, mainly an optical system therein, according to the present Embodiment 2 of the present invention, and corresponds to the above illustrated FIG. 1, while FIG. 6 and FIG. 7 correspond to FIG. 2 and FIG. 3, respectively. This Embodiment 2 also uses a rod type integrator 6 having a solid rod. According to the present Embodiment 2, parallel glass plates 11 each having a uniform thickness and being made of a material having a refractive index similar to that of the solid rod are attached to an entrance face 6a, as a focal plane, and an exit face 6c, as a further focal plane, of the solid rod of the integrator 6, respectively, using a light transmitting resin. This point differentiates Embodiment 2 from Embodiment 1. Except for this point, Embodiment 2 is similar to Embodiment 1. It is to be noted here that each of the glass plates 11 has a coefficient of linear thermal expansion similar to that of the solid rod, to which the glass plates are attached. Accordingly, the interface between the solid rod and each glass plate is prevented from causing stress due to temperature rise.

Figure 8:
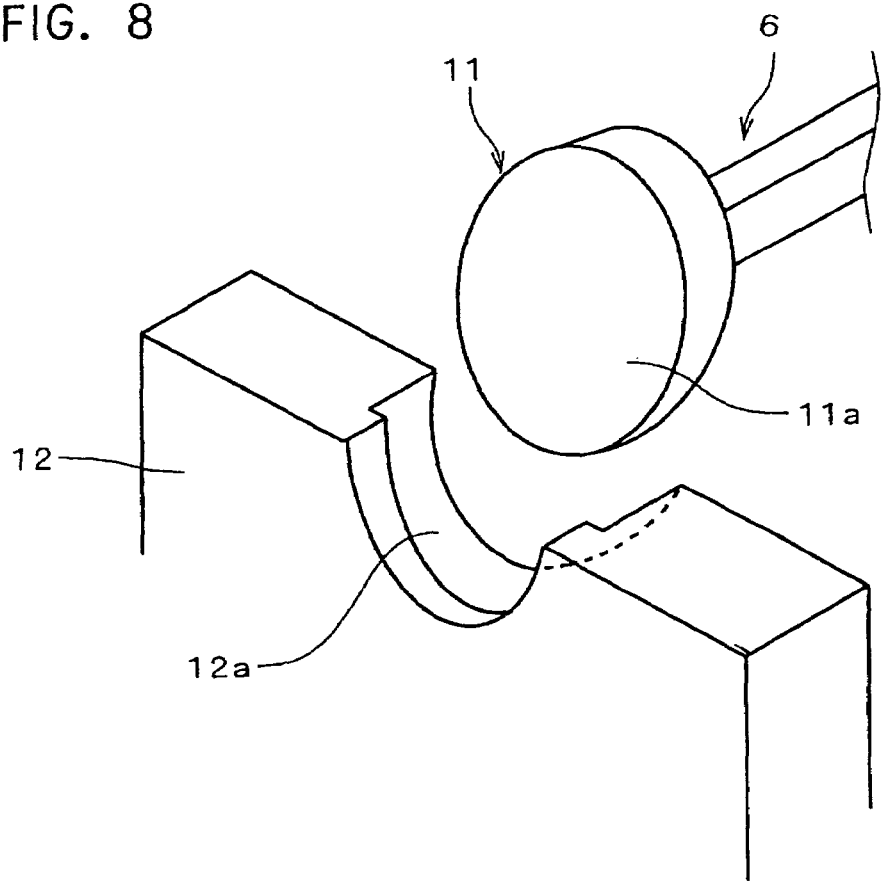
FIG. 8 is a schematic perspective view of a part of a holding structure for holding the rod type integrator.

FIG. 8 shows a part of a holding structure for holding the rod type integrator. A flange-shaped extension portion 11a of each parallel glass plate 11 is placed in an arc-shaped recess 12a of a frame 12 in a projection engine, and is provided with e.g. a cover (not shown) at and from an upper part thereof, whereby the integrator 6 is held and fixed. The arc of the arc-shaped recess 12a is designed to have the same curvature as that of the arc of the flange-shaped extension portion 11a.

It is to be noted here that an optical axis of each of the glass plates 1 having the flange-shaped extension portion 11a is aligned with an optical axis of the solid rod of the integrator 6, and that optical components each having an optical axis and being to be provided in front and behind the integrator 6 are placed at appropriate positions (not shown) of the frame 12 of the projection engine. Thus, it is possible for the arc-shaped recess 12a to hold the flange-shaped extension portion 11a with reduced number of mechanical components, thereby facilitating relative positioning (central axis alignment) between the integrator 6 and each optical component having an optical axis. Furthermore, the solid rod of the integrator 6 can be easily set at a desired position (easy integrator angle adjustment) by rotating, for adjustment, the flange-shaped extension portion 11a about the axis thereof. Since the solid rod of the integrator 6 has the flange-shaped extension portions 11a at both ends thereof, it is possible to facilitate ventilation for the integrator, so that the integrator 6 in its entirety can be easily cooled even under an environment where the integrator 6 is heated to a high temperature.

Embodiment 3

Figure 9A:
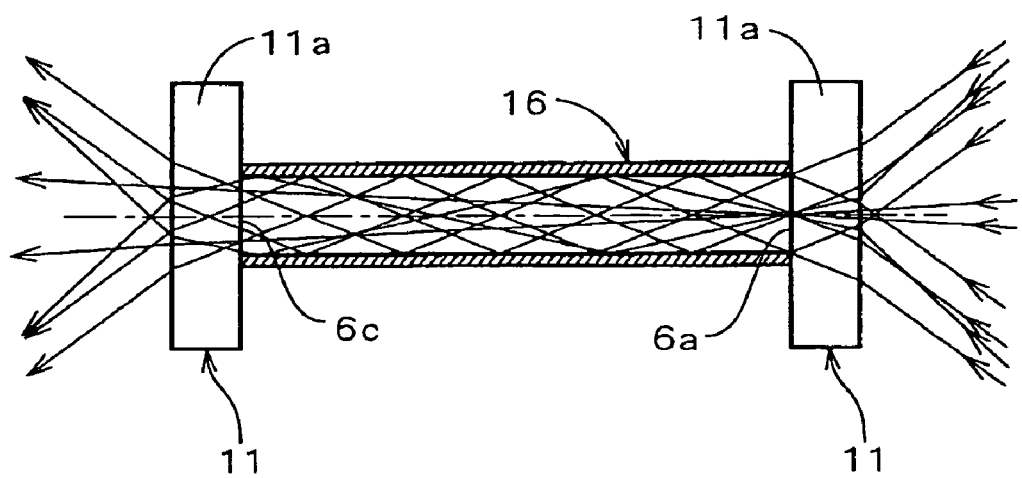
Figure 9B:
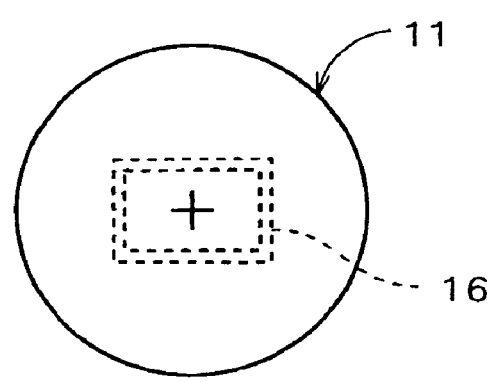
FIG. 9B is a schematic front view thereof.

FIG. 9 shows a rod type integrator, having a structure of light tunnel, to be used for an image projection optical system in a projection type display apparatus according to Embodiment 3. According to the present Embodiment 3, a hollow rod 16 having a structure of light tunnel, which has an internal surface made of mirror surface, is used in place of the solid rod of the rod type integrator 6 in the preceding Examples. In this case, in addition to a parallel glass plate 11 intimately attached to an exit face 6c, as a focal plane, of the hollow rod, a further parallel glass plate 11 is also intimately attached to an entrance face 6a, as a further focal plane, of the hollow rod, whereby the light tunnel of the hollow rod 16 has a closed structure therein. Each of such parallel glass plates 11 can be similar to those in the preceding Examples.

The present invention is not limited to such configurations as those described in the foregoing Examples, and various modifications are possible. For example, although it has been illustrated in many of the foregoing Examples to attach parallel glass plates to both the entrance face and the exit face of the rod, it is possible to omit the glass plate at the entrance face, with the glass plate being provided at the exit face only, in order to achieve some desired effect.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A projection type display apparatus comprising:
    a lamp to emit light;
    a rod type integrator comprising a solid rod to have the light from the lamp enter an entrance face at an end thereof and to guide the light by having the light internally reflected therein as well as to emit the light from an exit face at another end thereof;
    an electro-optical device having an illuminated surface, on which the light emitted from the integrator is illuminated, and being provided to modulate the light for forming an image; and
    optical components, including a lens unit, to project, onto a screen, the image formed by the electro-optical device,
    wherein a glass plate is attached to the exit face of the solid rod,
    wherein the exit face of the solid rod serves as a focal plane of the lens unit which is placed facing the exit face of the solid rod, with the glass plate intervening between the lens unit and the exit face of the solid rod;
    wherein the glass plate has a flange-shaped extension portion extending from periphery of the solid rod, the flange-shaped extension portion serving as a holding portion for holding the integrator;
    wherein the solid rod is made of a glass material having a rectangular cross section, wherein the glass plate is a parallel glass plate having a uniform thickness and is made of a material having a refractive index similar to that of the solid rod; and
    wherein a further glass plate is attached to the entrance face of the solid rod.

2. The projection type display apparatus according to claim 1, wherein a light transmitting resin is used to attach the glass plate to the exit face of the solid rod.

3. The projection type display apparatus according to claim 1, wherein the integrator comprises, in place of the solid rod, a hollow rod having a structure of light tunnel which has an internal surface made of mirror surface, wherein a further glass plate is intimately attached to the entrance face of the hollow rod, whereby the light tunnel has a closed structure therein.

4. A projection type display apparatus comprising:
    a lamp to emit light;
    a rod type integrator comprising a solid rod to have the light from the lamp enter an entrance face at an end thereof and to guide the light by having the light internally reflected therein as well as to emit the light from an exit face at another end thereof;

an electro-optical device having an illuminated surface, on which the light emitted from the integrator is illuminated, and being provided to modulate the light for forming an image; and optical components, including a lens unit, to project, onto a screen, the image formed by the electro-optical device, wherein glass plates are attached to the exit face and the entrance face of the solid rod, respectively, wherein each of the glass plates has a flange-shaped extension portion extending from periphery of the solid rod and having a circular or a partially arc shape, the flange-shaped extension portion serving as a holding portion for holding the integrator, and wherein an optical axis of each of the glass plates having the flange-shaped extension portion is aligned with an optical axis of the solid rod; and wherein the solid rod is made of a glass material having a rectangular cross section, wherein each glass plate is a parallel glass plate having a uniform thickness and is made of a material having a coefficient of linear thermal expansion similar to that of the solid rod.

5. The projection type display apparatus according to claim 4, wherein a light transmitting resin is used to attach the glass plates to the exit face and the entrance face of the solid rod, respectively.

6. A projection type display apparatus comprising:

a lamp to emit light;

a rod type integrator comprising a hollow rod having a structure of light tunnel which has an internal surface made of mirror surface, light from the lamp entering an entrance face at an end thereof and guiding the light through the light tunnel, as well as to emit the light from an exit face at another end thereof;

an electro-optical device having an illuminated surface, on which the light emitted from the integrator is illuminated, and being provided to modulate the light for forming an image; and optical components, including a lens unit, to project, onto a screen, the image formed by the electro-optical device, wherein glass plates are intimately attached to the exit face and the entrance face of the hollow rod, respectively, whereby the light tunnel has a closed structure therein;

wherein each of the glass plates has a flange-shaped extension portion extending from periphery of the hollow rod and having a circular or a partiality arc shape, the flange-shaped extension portion serving as a holding portion for holding the integrator, and wherein an optical axis of each of the glass plates having the flange-shaped extension portion is aligned with an optical axis of the hollow rod;

wherein the hollow rod is made of a glass material having a rectangular cross section, wherein each glass plate is a parallel glass plate having a uniform thickness and is made of a material having a coefficient of linear thermal expansion similar to that of the hollow rod.

* * * * *